(12) United States Patent
Spriggel

(10) Patent No.: US 9,343,049 B1
(45) Date of Patent: May 17, 2016

(54) CYMBAL CLAMP ASSEMBLY

(71) Applicant: Daniel John Spriggel, Bermuda Dunes, CA (US)

(72) Inventor: Daniel John Spriggel, Bermuda Dunes, CA (US)

( * ) Notice: Subject to any disclaimer, the term of this patent is extended or adjusted under 35 U.S.C. 154(b) by 119 days.

(21) Appl. No.: 13/999,698

(22) Filed: Mar. 18, 2014

Related U.S. Application Data

(60) Provisional application No. 61/853,700, filed on Apr. 10, 2013.

(51) Int. Cl.
*G10D 13/02* (2006.01)
*G10D 13/06* (2006.01)

(52) U.S. Cl.
CPC ....................... *G10D 13/06* (2013.01)

(58) Field of Classification Search
USPC ....................................................... 84/411 R
See application file for complete search history.

(56) References Cited

U.S. PATENT DOCUMENTS

| | | | | | |
|---|---|---|---|---|---|
| 5,482,235 | A | * | 1/1996 | Atsumi | G10D 13/065 248/121 |
| 5,808,217 | A | * | 9/1998 | Liao | G10D 13/065 248/121 |
| 6,011,209 | A | * | 1/2000 | Liao | G10D 13/065 84/422.1 |
| 6,417,434 | B1 | * | 7/2002 | Lao | G10D 13/06 84/422.1 |
| 8,338,682 | B1 | * | 12/2012 | Sikra | G10D 13/02 84/422.1 |
| 8,604,325 | B2 | * | 12/2013 | Sato | G10D 13/065 84/422.3 |

* cited by examiner

*Primary Examiner* — Christopher Uhlir
(74) *Attorney, Agent, or Firm* — Jack C. Munro

(57) ABSTRACT

A single unit that is used to support a cymbal on a stanchion and also secure the unit to the stanchion. The cymbal is supported between a pair of soft discs with a nut provided that can be tightened or loosened for the drummer to select how tight the cymbal is secured or how not so tight thereby varying the sound emitted from the cymbal when struck by a drumstick. The unit also has a slotted collet through which the mounting rod of the stanchion is conducted. The exterior surface of the collet is tapered which fits in a tapered cavity in a body. A nut is mounted by threads on the body and when turned on the body will cause the collet to press further into the tapered cavity which will cause the collet to tightly engage with the mounting rod.

3 Claims, 11 Drawing Sheets

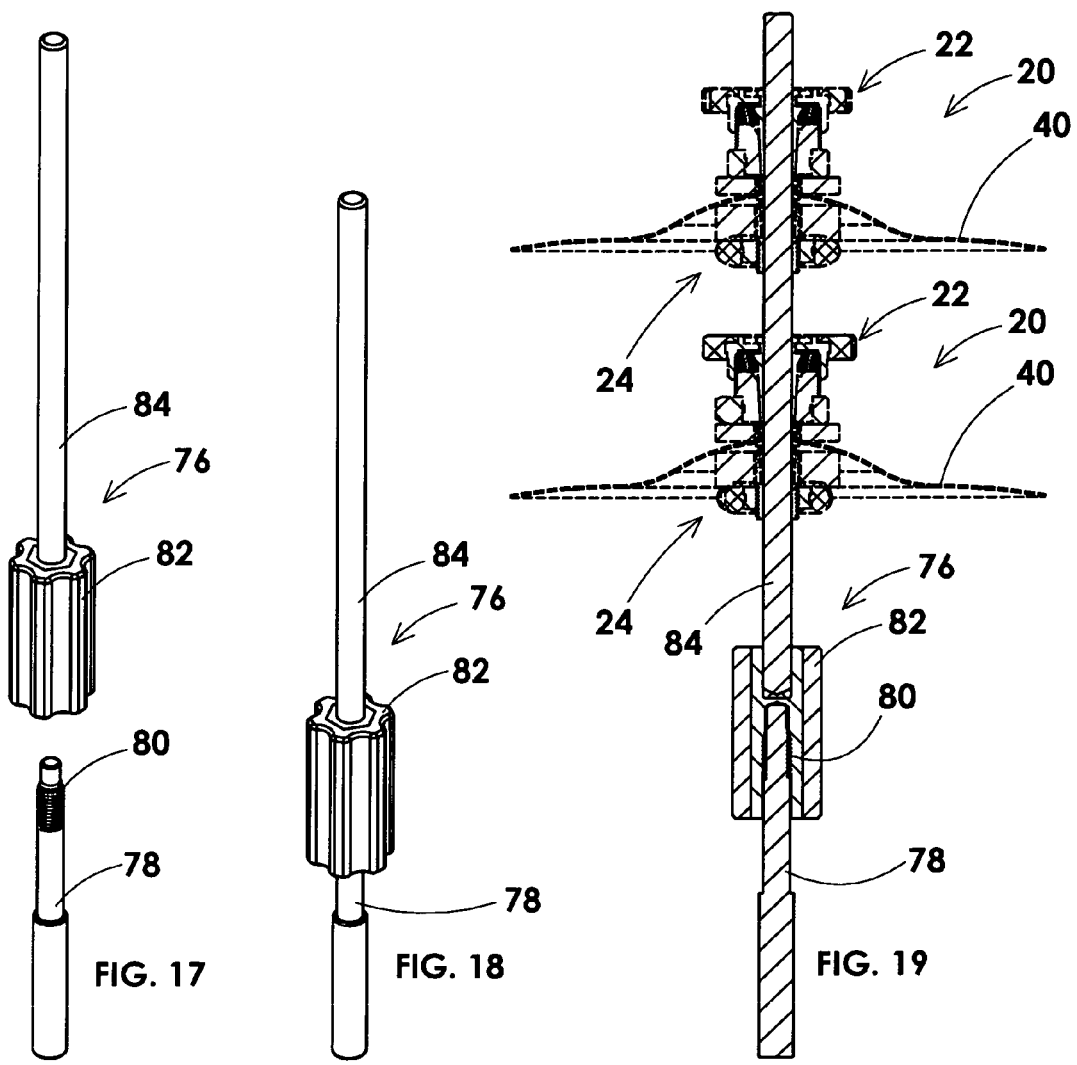

CYMBAL CLAMP ASSEMBLY

REFERENCE TO PRIOR APPLICATION

The basis for this application is disclosed in provisional patent application entitled Cymbal Clamp Assembly, Ser. No. 61/853,700, filed Apr. 10, 2013, by the present inventor.

BACKGROUND OF THE INVENTION

Description of the Prior Art

A cymbal is a common musical instrument used by percussionists (drummers). For a given drummers musical setup there will be used a plurality of cymbals mounted on one or more mounting rods of supporting stanchions. Each cymbal is removably mounted in a fixed position on a mounting rod by a wing nut clamp assembly. Previously the prior art clamp assembly was many inches in length as it was composed of two separate units which limited the number of cymbals that could be reasonably mounted on a mounting rod. Also, the cymbals are frequently assembled and disassembled as the musicians move the equipment between locations. The cymbal clamp assembly is separated from its cymbal when uninstalled. Also, the cymbal clamp assemblies must be separated into its parts during disassembly. These parts can become separated and misplaced or lost when traveling which would render the instrument stanchion inoperable at the new location.

Cymbals have always been mounted by a wing nut and a pair of soft discs on a stanchion mounting rod. Each time the cymbal is installed for usage, which is often, the cymbal is grabbed by the drummer and then placed between the soft discs and the wing nut tightened. There are at least five different parts that make up this securing arrangement which opens the possibility that these parts could be misplaced or lost. The drummer also handles the cymbal which contaminates the surface of the cymbal with oil from the drummer's hands. Accumulation of this oil will slightly change the sound produced by the cymbal which is not desirable. Also, some prior art cymbal clamp assemblies, specifically called hi-hat clutch assemblies, utilize a threaded tube and a threaded hole which is perpendicular to the threaded tube with a wing nut which tightly bites into its mounting rod. This biting deteriorates the rod requiring premature replacement.

Next the cymbal has to be secured on a stanchion mounting rod at a desired location which is individually selected by the drummer according to the personal desires of the drummer. The drummer has a choice of either a four inch, six inch or a twelve inch mounting rod extension which has a threaded upper end that is used to attach the cymbal. A second wing nut and tightening nut assembly is then used which comprises a plurality of parts which can be misplaced or lost. It would be desirable to utilize a single unit, not multiple units, which clamps onto the cymbal and the mounting rod at any selected mounting position not just at the upper end of the mounting rod or mounting rod extension.

SUMMARY OF THE INVENTION

A cymbal clamp assembly which has a through center hole through which a mounting rod is to be passed. The cymbal clamp assembly has a dual clamping arrangement. The first clamping arrangement utilizes a pair of sound damping washers or discs constructed of a soft material with the cymbal to be mounted therebetween. One soft disc is to be movable relative to the other soft disc to tightly clamp and hold the cymbal. The movement of the soft disc is accomplished by turning of a nut which surrounds the mounting rod in the first embodiment of this invention. In this first embodiment the second clamping arrangement includes a slotted collet which is mounted about the mounting rod. Also in this first embodiment there is used a compression cap, which surrounds the mounting rod, is located about the slotted collet which is designed for movement on the mounting rod. Tightening of the compression cap causes the slotted collet to move decreasing the diameter of its through hole and tightens same on the mounting rod fixing the cymbal clamp assembly on the mounting rod. There is no need to use a mounting rod extension which has a threaded upper end. The clamp assembly of this invention can be installed at any location on the mounting rod extension. If the mounting rod extension is long enough there can be installed multiple cymbals achieving a stacking arrangement.

The cymbal clamp assembly of this invention allows for separation of the cymbal from a mounting stand or stanchion without disassembly of the cymbal clamp assembly from the cymbal. The cymbal clamp assembly of this invention, being significantly shorter in length than prior art clamping devices, permits close stacking of cymbals on a mounting rod with infinite adjustability being permitted on that mounting rod. During storage when the musician is moving between locations, the cymbal clamp assembly will remain with the cymbal as a whole eliminating discrete part disassembly and reassembly which eliminates the possibility of lost or misplaced parts. The cymbal clamp assembly is mounted on its mounting rod and clamped tightly to the cymbal not damaging same.

BRIEF DESCRIPTION OF THE DRAWINGS

FIG. 17 is an isometric view of a new type of mounting rod extension that is usable with this invention that is disconnected from the mounting rod;

FIG. 18 is a view similar to FIG. 17 but showing the mounting rod extension connected to the mounting rod; and FIG. 19 is a longitudinal cross sectional view of the mounting rod and mounting rod extension of FIG. 18 depicting attaching of a pair of cymbals on the mounting rod extension.

DETAILED DESCRIPTION OF THE INVENTION

Figure 1:
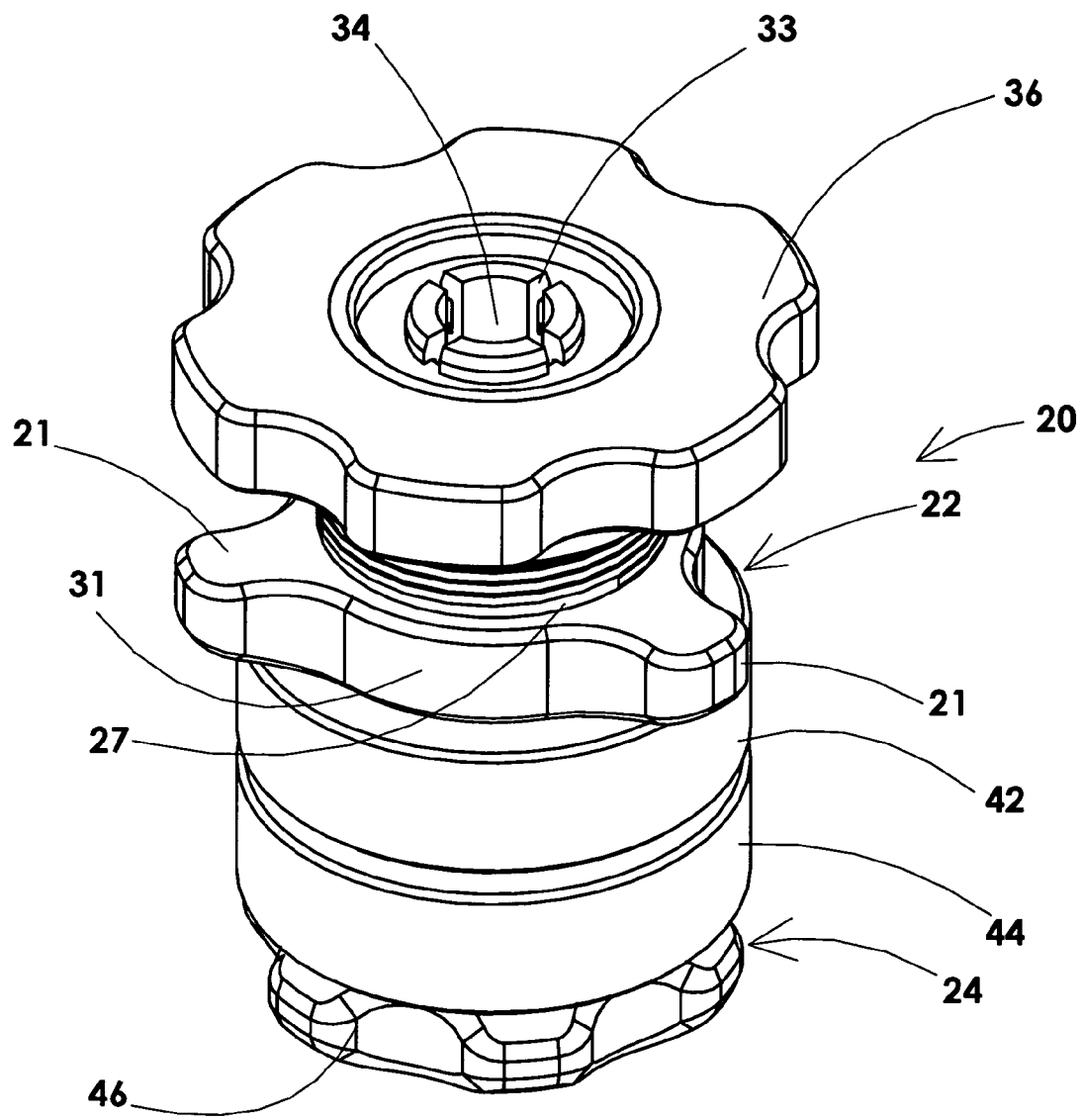
FIG. 1 is an exterior isometric view of the first embodiment of the cymbal clamp assembly of this invention.
Figure 2:
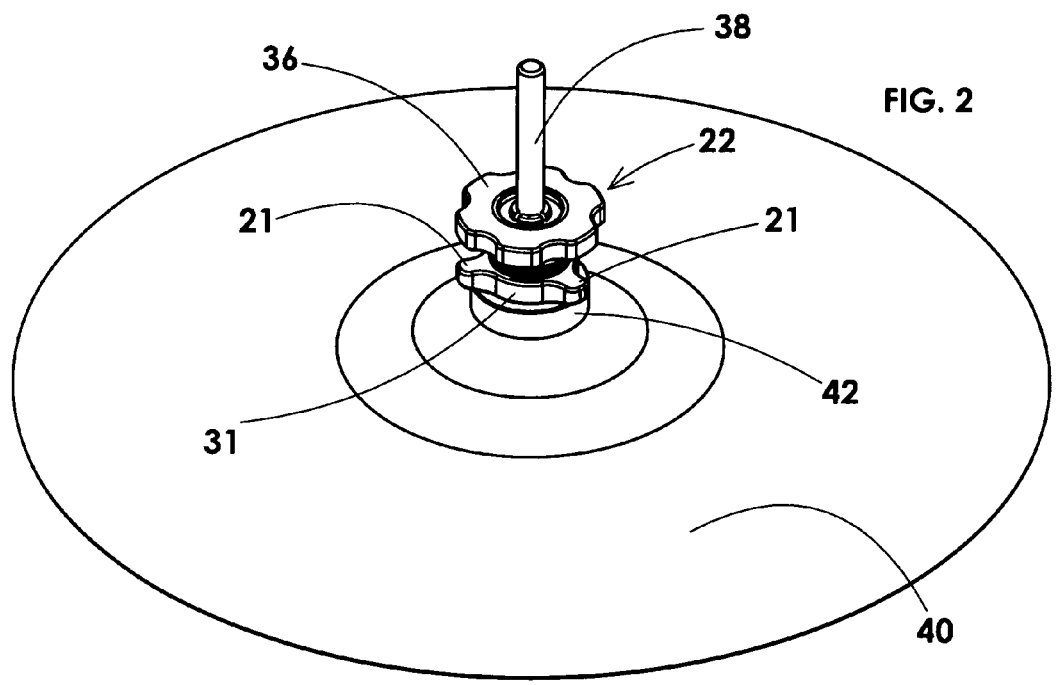
FIG. 2 is an isometric view of the upper surface of a cymbal upon which has been installed the first embodiment of cymbal clamp assembly of this invention.
Figure 3:
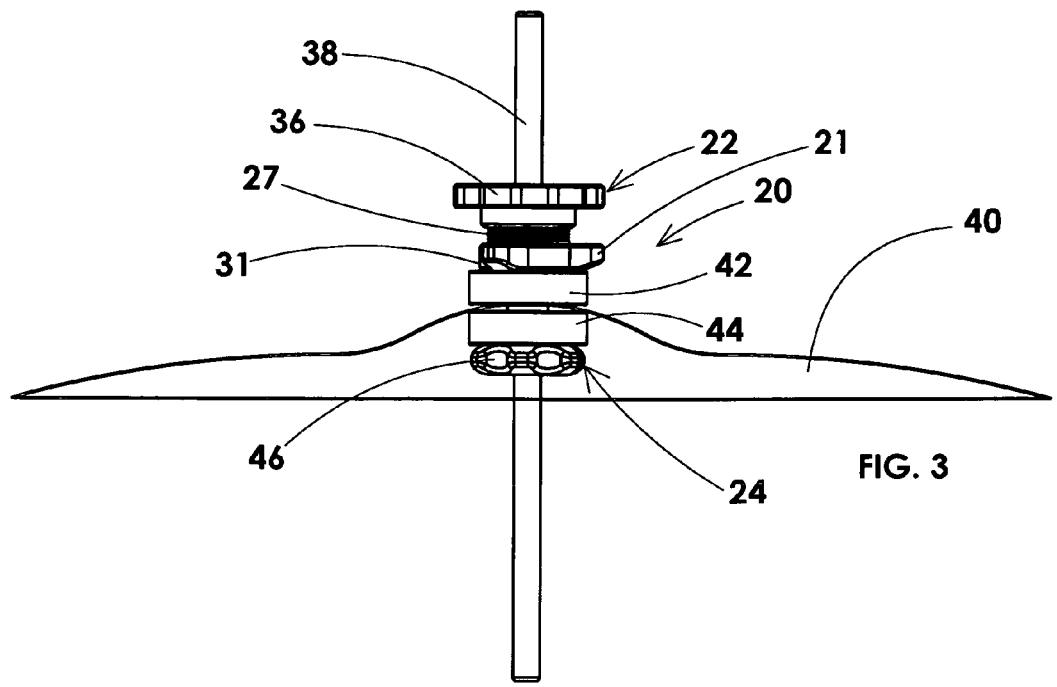
FIG. 3 is an exterior side view of the first embodiment of cymbal clamp assembly of this invention where the cymbal is shown in cross section.
Figure 4:
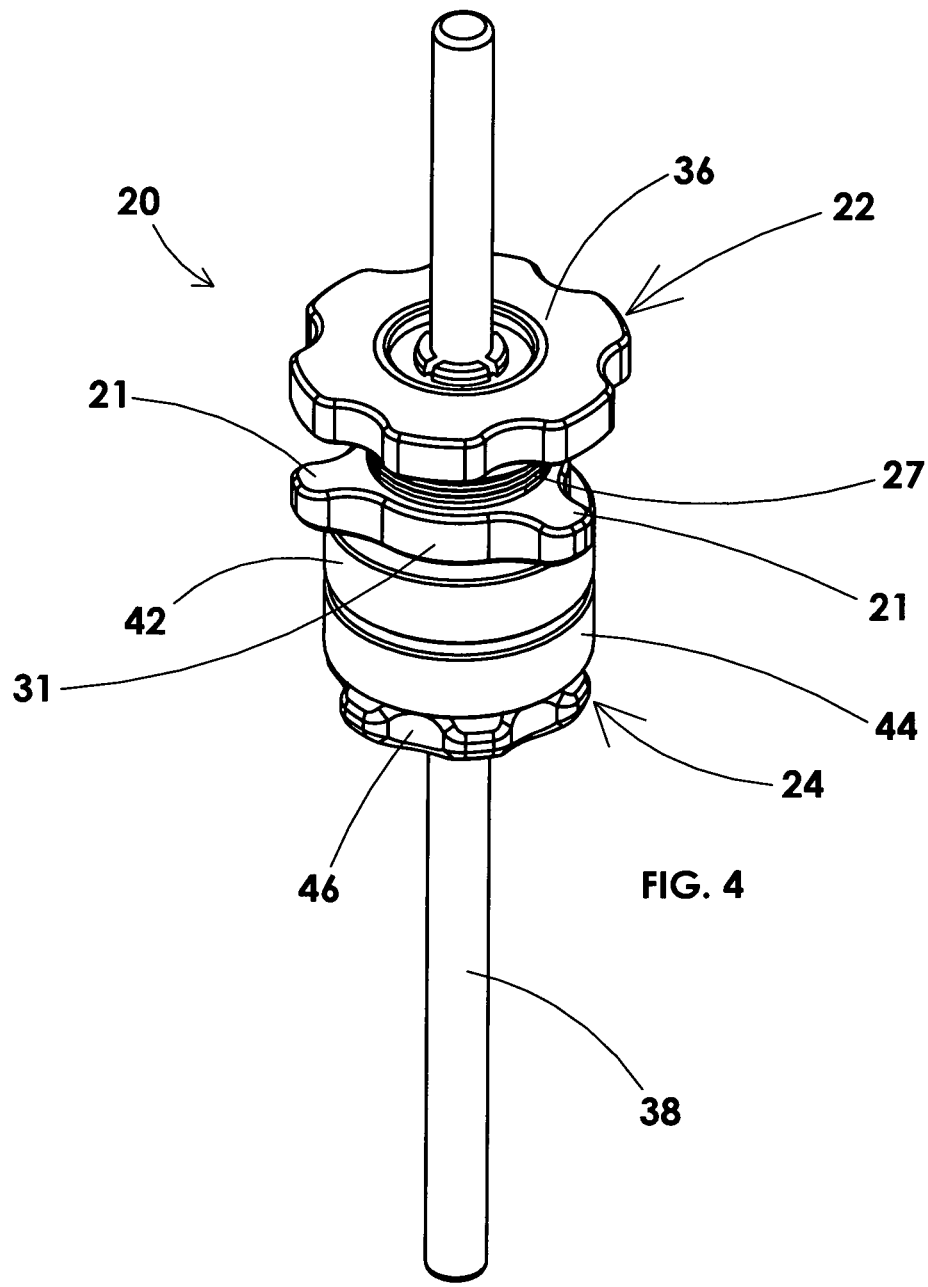
FIG. 4 is an exterior isometric view of the first embodiment of cymbal clamp assembly of this invention similar to FIG. 1 showing the cymbal clamp assembly mounted on a mounting rod where the cymbal is not shown.
Figure 5:
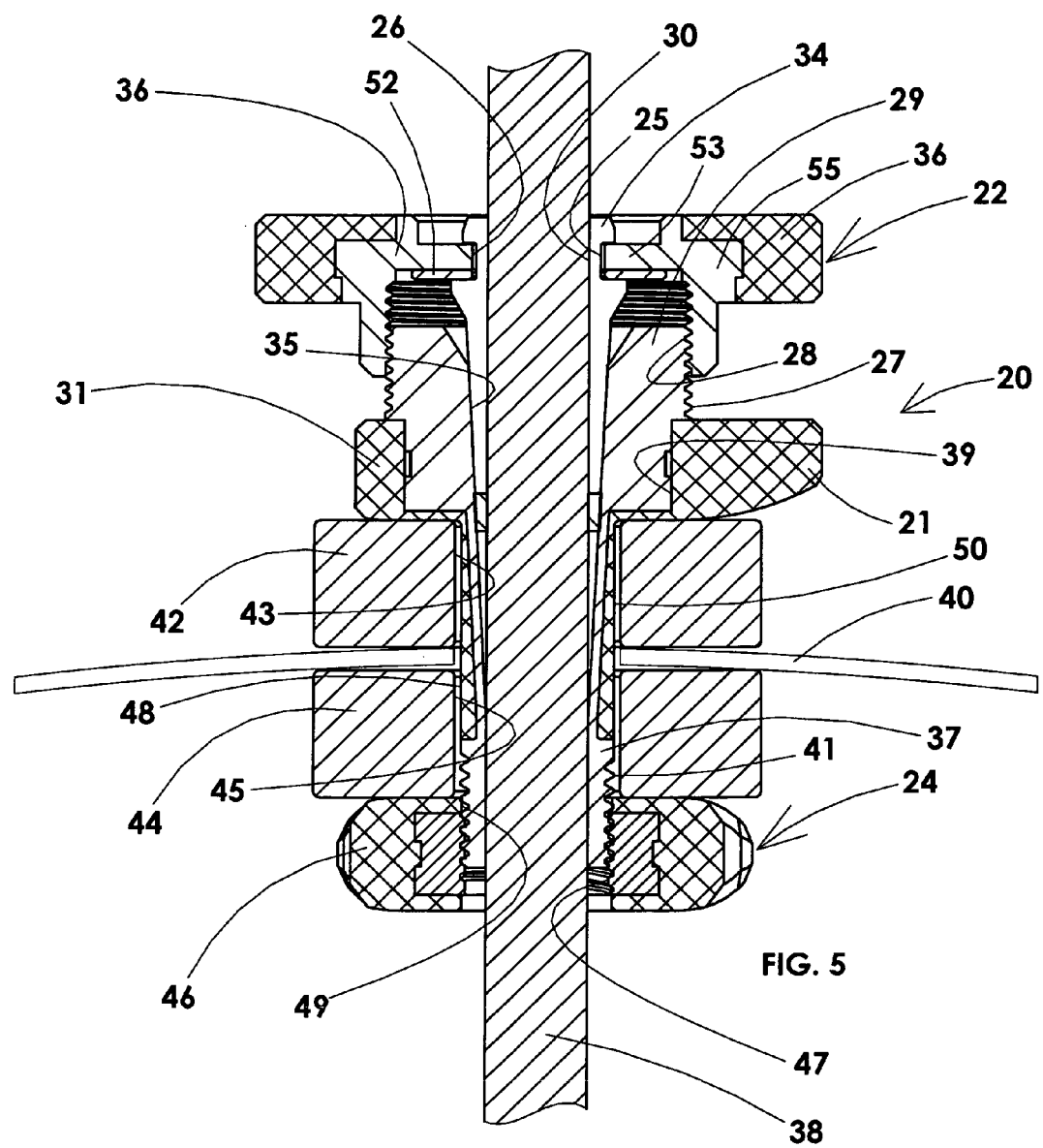
FIG. 5 is a longitudinal cross sectional view of the cymbal clamp assembly shown in FIG. 3.
Figure 6:
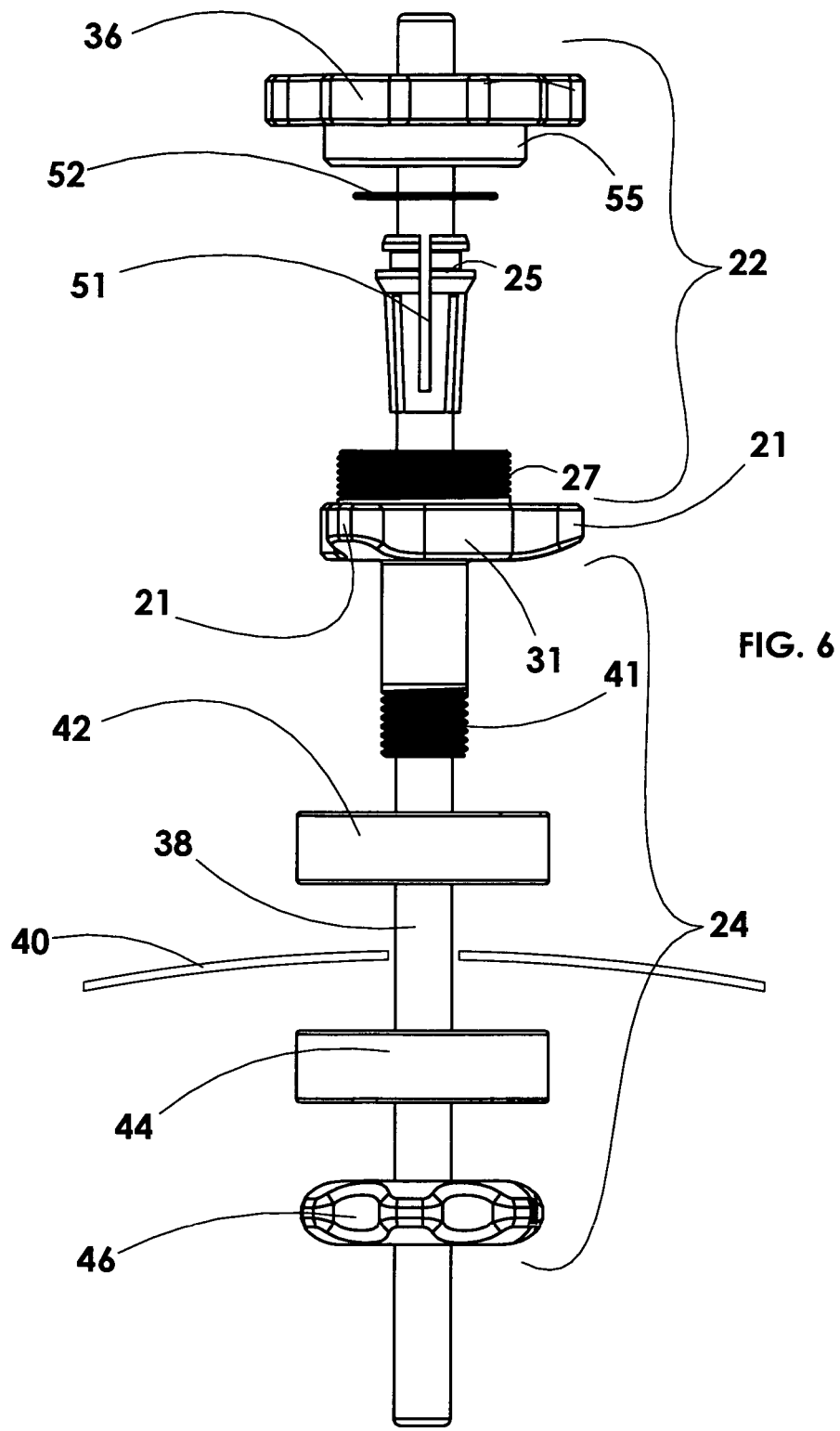
FIG. 6 is a view similar to FIG. 3 but showing the different parts of the cymbal clamp assembly disconnected from each other.
Figure 7:
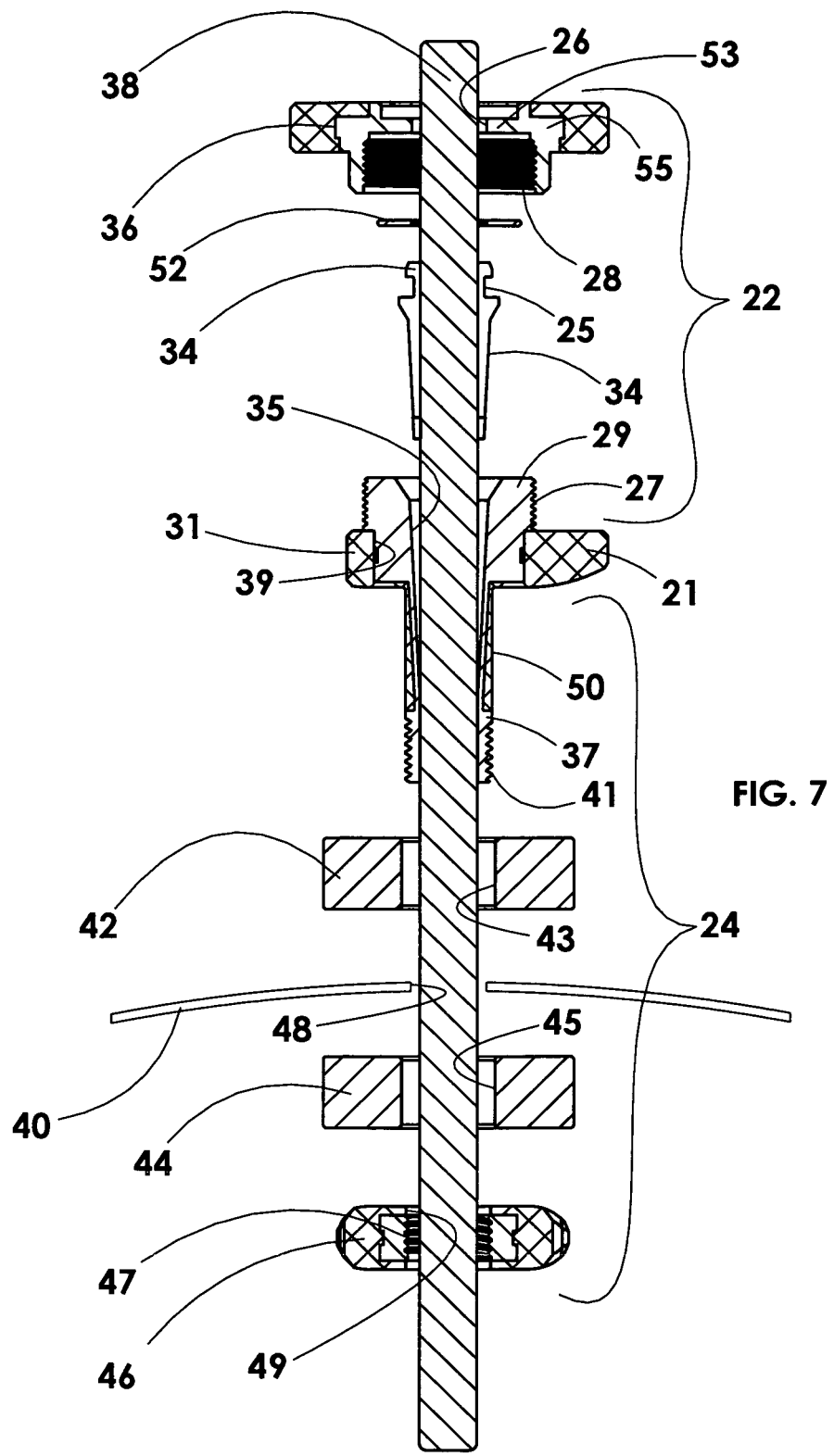
FIG. 7 is view similar to FIG. 6 but showing the different parts of the cymbal clamp assembly in cross section.
Figures 8, 9:
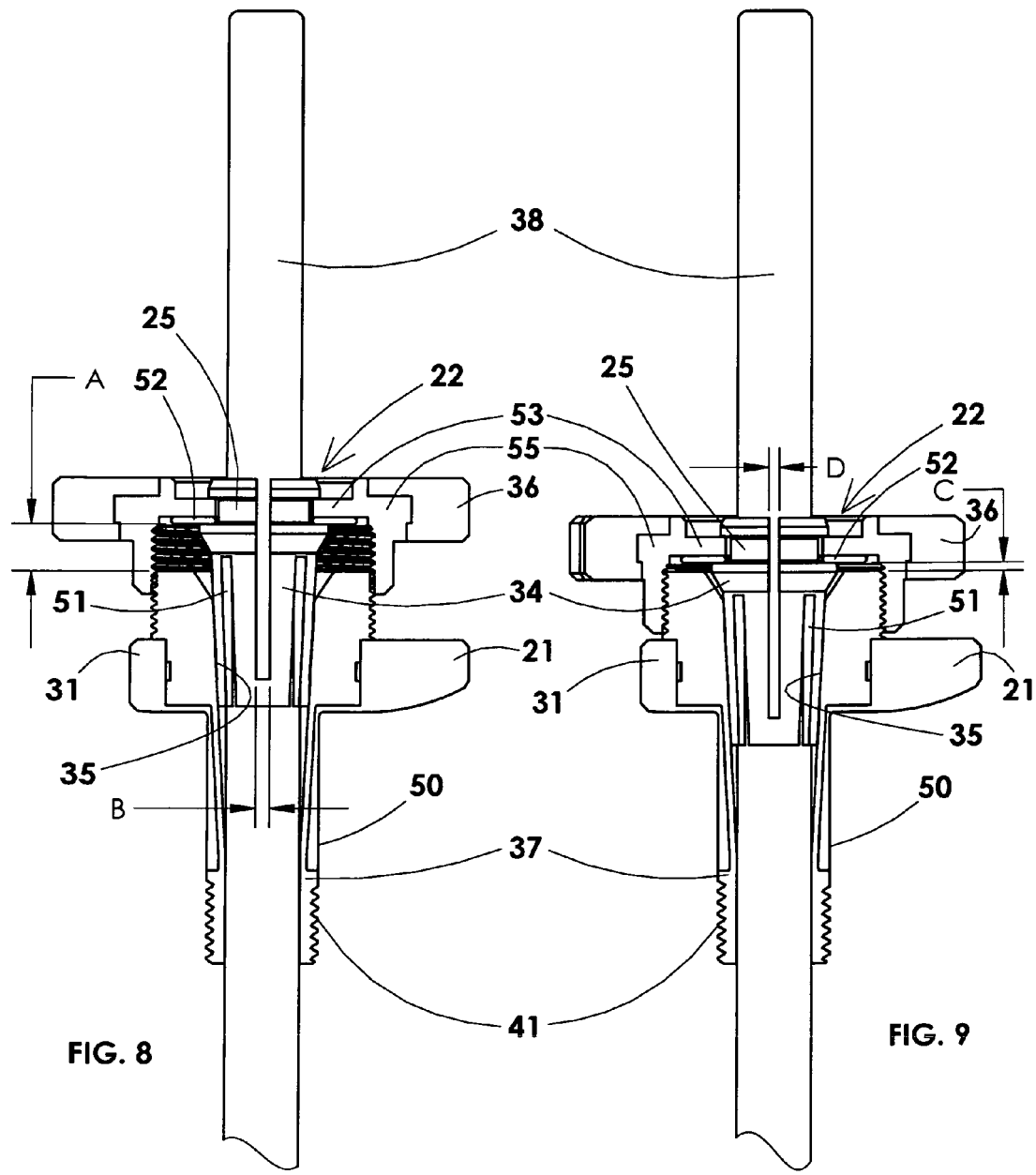
FIG. 8 is a longitudinal cross sectional view taken through the upper part of the cymbal clamp assembly showing the compression cap loosened so the upper part could move longitudinally on the mounting rod.
FIG. 9 is a view similar to FIG. 8 but showing the compression cap tightened which fixes the upper part of the cymbal clamp assembly onto the mounting rod.

Referring particularly to FIGS. 1-10, there is shown a cymbal clamp assembly 20 of this invention. The cymbal clamp assembly is composed of a first clamping arrangement 24 and a second clamping arrangement 22. Both clamping arrangements 22 and 24 are to be mounted on a mounting rod 38 of a musicians stand or stanchion (not shown). A typical musicians stanchion has a plurality of telescoping rods which are connected together extending from a tripod base.

The second clamping arrangement 24 includes a pair of soft discs 42 and 44. Soft disc 42 has a center hole 43 and soft disc 44 has a center hole 45. The typical material of construction of discs 42 and 44 will be felt although possibly a rubber composition could be used. The discs 42 and 44 are to function as a sound damper to sound produced by the cymbal 40 mounted between the discs. The cymbal 40 will be constructed of metal with usually brass or steel utilized. The cymbal 40 has a center hole 48 through which mounting rod 38 is conducted. Mounting rod 38 also passes through center holes 43 and 45. The discs 42 and 44 are normally identical in size although such is not mandatory.

Nut 46 is mounted on rod 38 which extends through center hole 49 in nut 46 which has a series of internal screw threads 47. Nut 46 is to abut continuously against disc 44. Disc 42 abuts continuously against the bottom surface of a grasping ring 31. Grasping ring 31 has three in number of knobs 21 which are equiangularly spaced apart. The knobs 21 facilitate manual grabbing and holding still the grasping ring 31. Also located within center holes 43 and 45 are sleeves 37 and 50. Sleeve 50 is located about sleeve 37. Sleeve 50 is integral with grasping ring 31. Sleeve 37 is integral with body 29. Grasping ring 31 is tightly secured to body 29.

The outer end of sleeve 50 is secured to annular extension 37 which includes a series of exterior screw threads 41. Annular extension 37 has center hole 39 through which mounting rod 38 is conducted. With the disc 44 and nut 46 removed from the mounting rod 38, the cymbal 40 is to be located against disc 42. Then disc 44 is placed against cymbal 40. Nut 46 is then engaged by threads 47 and 41 and then tightened the desired amount to bind against the cymbal 40. If the tightening action is loose, a more high pitched sound will be produced when cymbal 40 is struck with the drumstick. If the tightening action is tight, a lower pitch muted sound will be produced.

The second clamping arrangement 22 is as follows: The body 29 has a cavity 35 which is tapered with the narrowest part of the taper being located at threaded annular extension 37. The exterior surface of a slotted collet 34 is also tapered and fits in a close conforming manner within the cavity 35. Slotted collet 34 includes a plurality of slots 51 each of which have an open end and a closed end. These slots 51 permit the collet to be squeezed and its center through hole 30 decreased in diameter. Slotted collet 34 also includes a necked down annular cavity 25 on its exterior surface. A thin metal washer 52 sets within cavity 25. Also setting within cavity 25 is lip 53 of a metal insert 55. Metal insert 55 is fixedly secured within plastic compression cap 36. Metal insert 55 has a series of female screw threads 28 which engage with male screw threads 27. Slotted collet 34 has a center through hole 30. The center through hole 30 slidingly abuts in a close fitting manner with mounting rod 38.

Turning of compression cap 36 in one direction will cause the tapered collet 34 to be moved further into tapered cavity 35 which will narrow the open end of the slots 51. The cap 36 will move from point A in FIG. 8 to point C in FIG. 9 and the slots will narrow from width B in FIG. 8 to width D in FIG. 9. This will cause the slotted collet 34 to frictionally bind against the mounting rod 38 tightly fixing the cymbal 40 on the mounting rod 38 preventing relative movement therebetween. Now the cymbal 40 will be ready to be played by the drummer.

When the playing has ended and the drummer wants to proceed to a new location, the drummer loosens compression cap 36 which will cause the slotted collet 34 to retract slightly expanding the open end of the slots 51. The entire cymbal clamp assembly 20 can then be slid off the mounting rod 38 and be handled by the drummer preventing contact with the cymbal 40. The cymbal clamp assembly 20 can then be placed in storage still attached to the cymbal 40 for transporting same.

Figure 10:
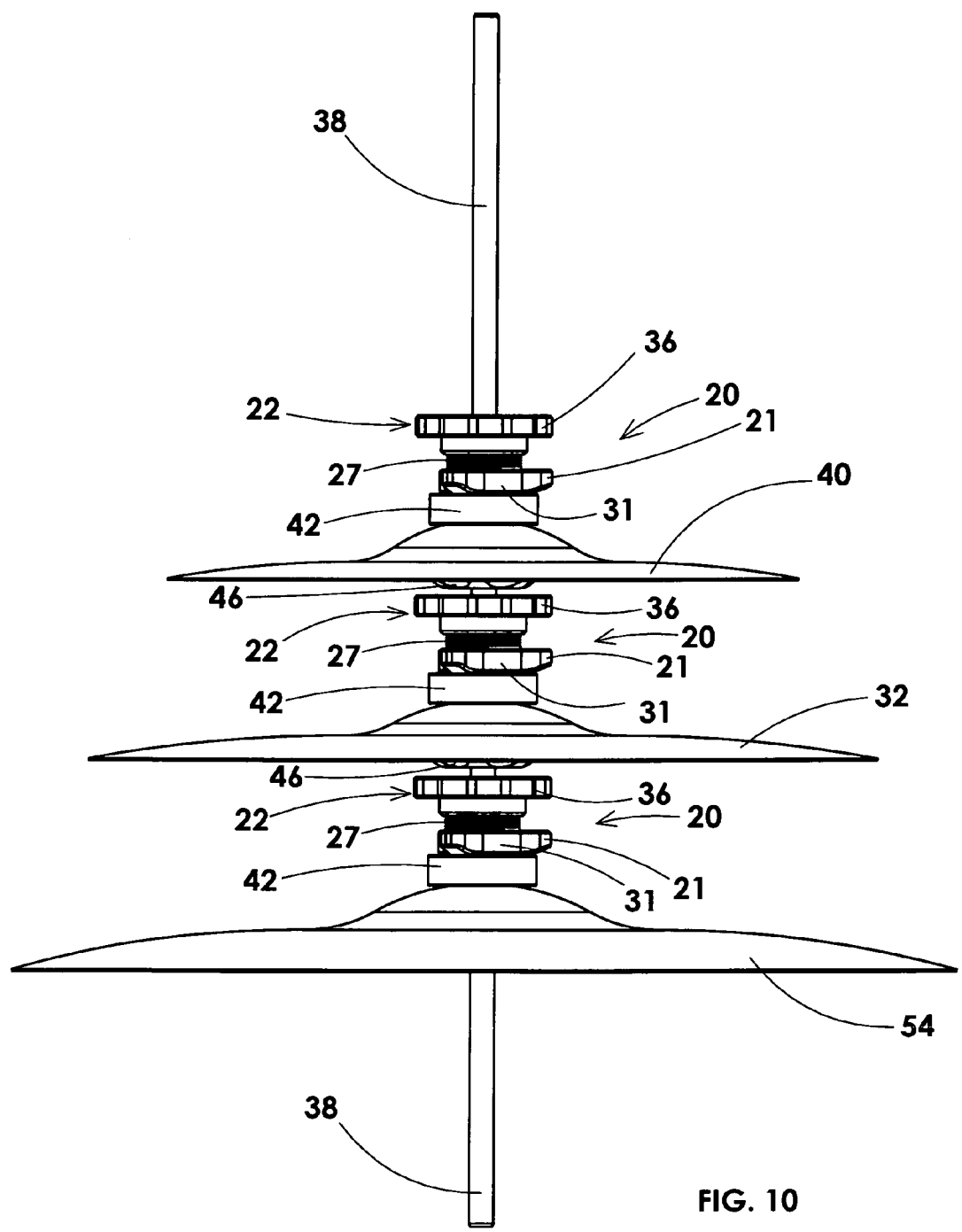
FIG. 10 is a side elevational view of a single mounting rod on which three cymbals are mounted each by a separate first embodiment of cymbal clamp assembly of this invention.

The cymbal clamp assemblies 20 are short in length which will permit stacking of a plurality of cymbals 40, 32 and 54 on a single mounting rod 38 which is shown in FIG. 10. Mounting rod extensions could also be used by being secured to a threaded upper end of the mounting rod which is not shown. These extensions could be of any length such as four inch, six inch or twelve inch. The cymbals 40, 32 and 54 can be of various diameters as is shown in FIG. 10.

Figures 11, 12:
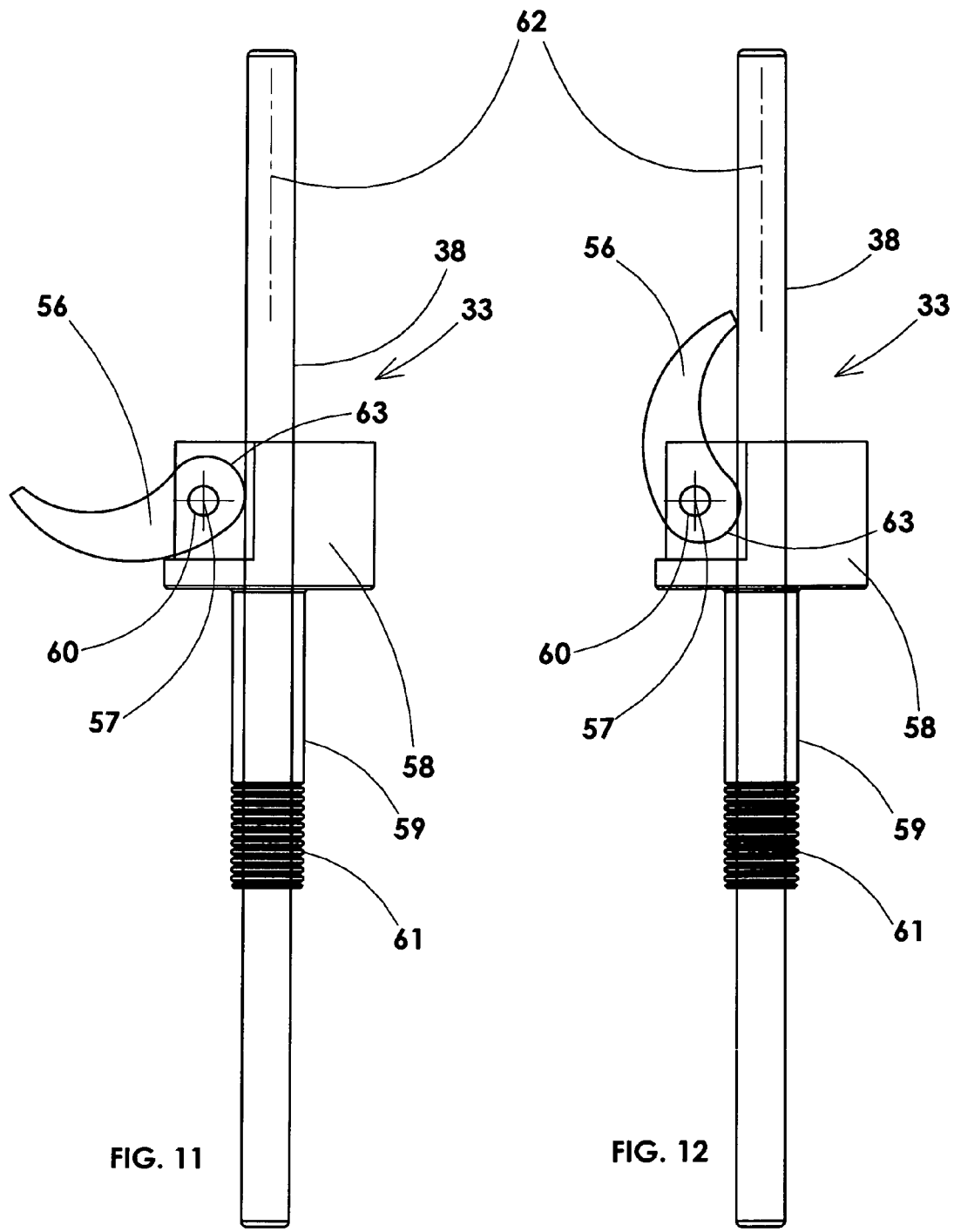
FIG. 11 is a side elevational view depicting a second embodiment of clamping assembly showing such in the unclamped position.
FIG. 12 is a view similar to FIG. 11 but showing the clamping assembly in the clamped position.
Figure 13:
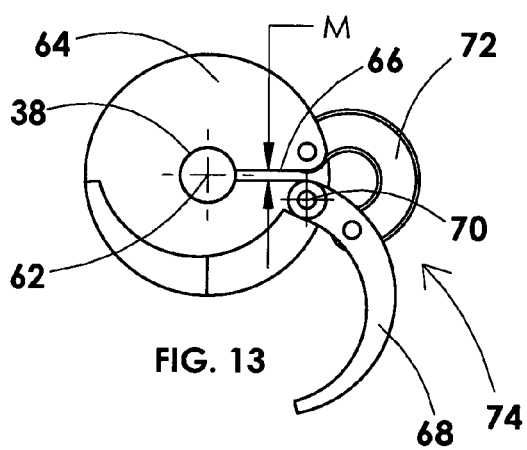
FIG. 13 is a top plan view of a third embodiment of clamping arrangement showing such in the unclamped position.
Figure 14:
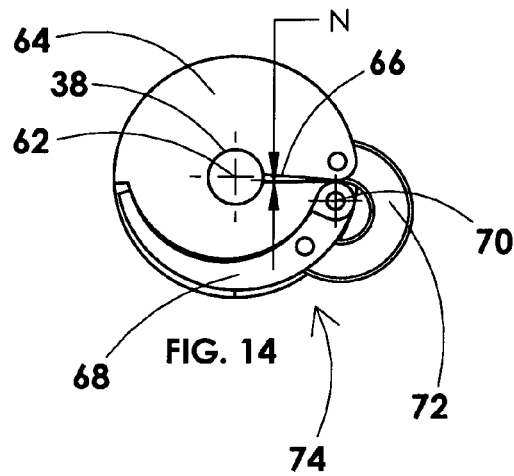
FIG. 14 is a view similar to FIG. 13 but showing the clamping arrangement in the clamped position.
Figure 15:
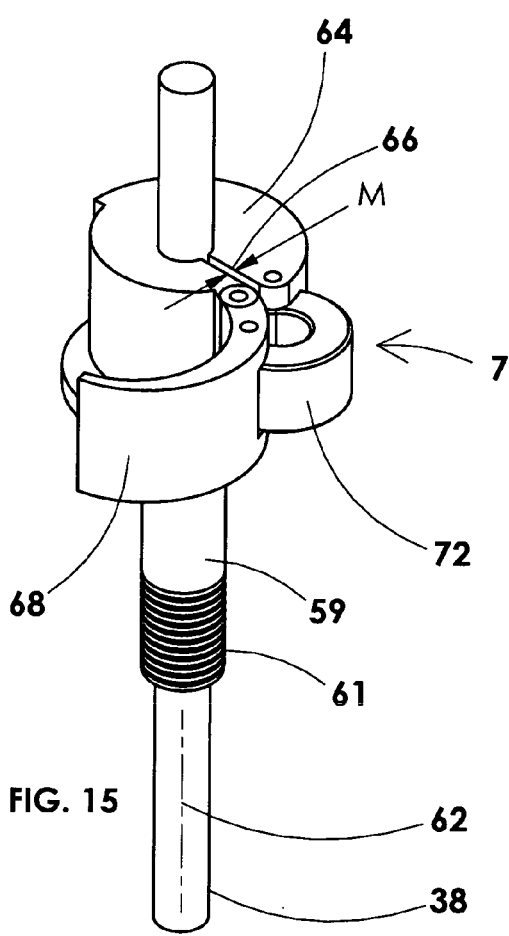
FIG. 15 is an isometric axial view of the third embodiment of clamping arrangement where the clamping arrangement is in the unclamped position.
Figure 16:
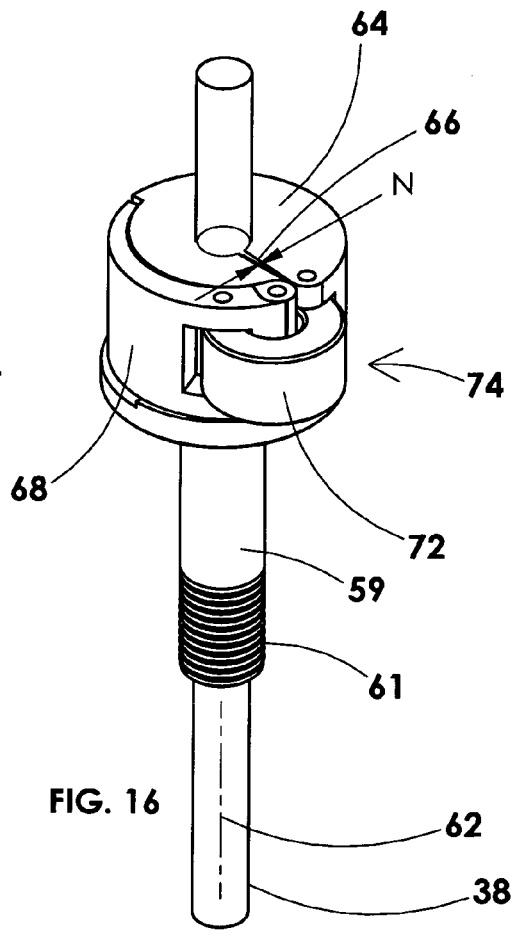
FIG. 16 is a view similar to FIG. 15 but where the clamping arrangement is in the clamped position.

Referring particularly to FIGS. 11 and 12 there is shown a second embodiment 33 of clamping arrangement which could be used instead of the second clamping arrangement 22. A camming lever 56 is pivotally mounted creating a pivot axis 57 on a housing 58. The housing 58 has an extension tube 59 which is located about mounting rod 38. Extension tube 59 terminates in a threaded section 61 at its outer end to which the first clamping arrangement 24 is to be connected. The inner end of the lever 56 functions as a camming surface 63 which is to abut against the mounting rod 38. In the unclamped position the camming lever 56 is in the position shown in FIG. 11 with the camming surface 63 slightly spaced from the mounting rod 38. In FIG. 12 the camming lever 56 is in the clamped position with the camming surface 63 tightly engaging against the surface of the mounting rod 38. The pivot axis 57 is located transverse to the longitudinal center axis 62 of the mounting rod 38. In FIG. 11 the entire cymbal clamping assembly 33 and 24 can be disengaged from the mounting rod by just being slid off. In FIG. 12 the second embodiment 33 and second clamping arrangement 24 is fixed to the mounting rod 38. Second embodiment 33 and second clamping arrangement 24 can be disengaged from the mounting rod 38 by just being slid off. In FIG. 12 the second embodiment 33 and second clamping arrangement 24 is fixed to mounting rod 38.

Referring to FIGS. 13 to 16, there is shown a third embodiment of cymbal clamp assembly 74. A housing 64 has a through center hole which connects to mounting rod 38. Housing 64 includes a radial slot 66 that extends between the center through hole of housing 64 and the peripheral surface of housing 64. A camming lever 68 is pivotally mounted about pivot axis 70 to housing 64. Pivot axis 70 is located parallel to longitudinal center axis 62 of mounting rod 38. One end of half circular link 72 is also pivotally mounted to housing 64 and the opposite end of link 72 is pivotally mounted to camming lever 68. Movement of camming lever 68 from the unclamped position shown in FIGS. 13 and 15 to the clamped position shown in FIGS. 14 and 16 will cause the radial slot to narrow from distance M in FIGS. 13 and 15 to distance N in FIGS. 14 and 16. The result is the cymbal clamp assembly 74 and 24 can be disengaged from the mounting rod 38 by just being slid off the mounting rod 38 when in the unclamped position of FIGS. 13 and 15. When in the clamped position of FIGS. 14 and 16 the cymbal clamp assembly 74 and 24 are fixed to the mounting rod 38.

A major advantage of the present invention is that there is no need for a typical prior art mounting rod extension that has a series of screw threads on its upper free end that are necessary to mount a cymbal on the rod extension. Referring to FIGS. 17-19 there is shown a typical mounting rod 78 that has a series of screw threads 80. A mounting rod extension 76 can be used that has a smoothly contoured rod 84 (no threads) at its upper end which is secured at its lower end to an enlarged nut which functions as a handle 82. The handle 82 has a series of internal screw threads which are to connect to screw threads 80. The rod 84 will typically be four, six or twelve inches in length. The rod can be used to mount a plurality of cymbals 40 in a stacked relationship as is shown in FIG. 19. The enlarged nut 82 facilitates manual installing and removing of rod 84 from mounting rod 78.

The invention claimed is:

1. A cymbal clamp assembly adapted to be mounted on a mounting rod comprising:
    a first clamping arrangement for tightly mounting said cymbal clamp assembly onto a cymbal, said first clamping arrangement including a pair of soft discs, one of said discs is movable relative to the other of said discs to clamp a cymbal therebetween;
    a second clamping arrangement for tightly mounting said cymbal assembly onto a mounting rod, said mounting rod adapted to be located on a stanchion, a body surrounding said mounting rod, said body extends from said first clamping arrangement to said second clamping arrangement;
    said body has a threaded sleeve, a first nut engaging with said threaded sleeve, manual turning of said first nut causes said one of said discs to move toward the other of said discs; and
    said second clamping arrangement includes a slotted collet, said slotted collet is mounted on said mounting rod, said slotted collet being mounted within said body, a second nut is threadably mounted on said body, movement of said second nut causes said slotted collet to move and compress against said mounting rod.

2. The cymbal clamp assembly as defined in claim 1 wherein:
    said slotted collet having a through center bore that has an interior surface, said interior surface is tapered and fits within a tapered hole formed in said body.

3. A cymbal clamp assembly adapted to be mounted on a mounting rod comprising:
    a first clamping arrangement for tightly mounting said cymbal clamp assembly onto a cymbal, said first clamping arrangement including a pair of soft discs, one of said discs is movable relative to the other of said discs to clamp a cymbal therebetween;
    a second clamping arrangement for tightly mounting said cymbal assembly onto a mounting rod, said mounting rod adapted to be located on a stanchion, a body surrounding said mounting rod, said body extends from said first clamping arrangement to said second clamping arrangement;
    said second clamping arrangement includes a body mounted about said mounting rod, said body having a tapered cavity, a slotted collet mounted in said tapered cavity, a nut threadably mounted on said body and surrounding same, movement of said nut can cause said slotted collet to move axially and be compressed against said mounting rod thereby fixing said cymbal clamp assembly to said mounting rod.

\* \* \* \* \*